US012768941B2

(12) United States Patent
Chang et al.

(10) Patent No.: US 12,768,941 B2
(45) Date of Patent: Oct. 20, 2026

(54) CIRCUIT AND METHOD FOR HANDLING WIRELESS SENSING

(71) Applicant: Realtek Semiconductor Corp., HsinChu (TW)

(72) Inventors: Chung-Yao Chang, HsinChu (TW); Chuan-Hu Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 234 days.

(21) Appl. No.: 18/908,818

(22) Filed: Oct. 8, 2024

(65) Prior Publication Data

US 2025/0155551 A1 May 15, 2025

(30) Foreign Application Priority Data

Nov. 15, 2023 (TW) ................................ 112144029

(51) Int. Cl.
*G01S 13/42* (2006.01)
*G01S 7/35* (2006.01)
*G01S 7/41* (2006.01)

(52) U.S. Cl.
CPC .............. *G01S 7/356* (2021.05); *G01S 7/415* (2013.01); *G01S 13/42* (2013.01)

(58) Field of Classification Search
CPC .......... G01S 7/356; G01S 7/415; G01S 13/42; G01S 13/584; G01S 7/006
See application file for complete search history.

(56) References Cited

U.S. PATENT DOCUMENTS

2011/0170623 A1* 7/2011 Park .................... H04L 25/0204
375/260

FOREIGN PATENT DOCUMENTS

| | | | |
|---|---|---|---|
| CN | 104142445 A | * | 11/2014 |
| CN | 114599086 A | | 6/2022 |
| CN | 116918309 A | | 10/2023 |

* cited by examiner

*Primary Examiner* — Timothy A Brainard
*Assistant Examiner* — Bongani Jabulani Mashele
(74) *Attorney, Agent, or Firm* — Winston Hsu

(57) ABSTRACT

A processing circuit includes: an estimating circuit, for generating a phase vector according to a phase signal, and for estimating the phase vector to generate an estimated phase matrix; a decomposing circuit, for decomposing the estimated phase matrix to generate an eigenvalue matrix and an eigenvector matrix; a first computing circuit, for performing a long-term average for a plurality of eigenvalues to generate a plurality of long-term eigenvalues; a second computing circuit, for computing a plurality of difference values for the plurality of long-term eigenvalues, and for determining an index corresponding to a difference value of the plurality of difference values; a spectrum generation circuit, for generating a pseudo spectrum according to the index, a plurality of eigenvectors and a steering vector; and a determining circuit, for determining at least one peak of the pseudo spectrum and at least one parameter corresponding to the at least one peak.

18 Claims, 10 Drawing Sheets

CIRCUIT AND METHOD FOR HANDLING WIRELESS SENSING

BACKGROUND OF THE INVENTION

1. Field of the Invention

The present invention relates to a circuit and a method used in a wireless communication system, and more particularly, to a circuit and a method for handling wireless sensing.

2. Description of the Prior Art

Wireless sensing has the characteristic of device-free recognition, and may be applied to indoor human activity recognition, gesture recognition, and presence/proximity detection, breathing monitoring, etc. A range, a velocity and an incident angle needed for the wireless sensing may be estimated through a digital signal processing (DSP). The DSP may be processed by Fast Fourier Transform (FFT), wherein a resolution of the FFT depends on a sampling frequency, an observation time and a number of receiving antennas. Increasing the observation time makes it impossible to observe instantaneous changes in a vibration frequency of a sensing object. Increasing the number of receiving antennas would result in increased hardware costs. Thus, the invention provides a circuit and a method for handling the wireless sensing that do not depend on the sampling frequency, the observation time and the number of receiving antennas in order to avoid the abovementioned problems.

SUMMARY OF THE INVENTION

The present invention therefore provides a circuit and a method to solve the issues in the related art.

A processing circuit comprises: an estimating circuit, for generating a phase vector according to a phase signal, and for estimating the phase vector to generate an estimated phase matrix; a decomposing circuit, coupled to the estimating circuit, for decomposing the estimated phase matrix to generate an eigenvalue matrix and an eigenvector matrix, wherein the eigenvalue matrix comprises a plurality of eigenvalues and the eigenvector matrix comprises a plurality of eigenvectors; a first computing circuit, coupled to the decomposing circuit, for performing a long-term average for the plurality of eigenvalues to generate a plurality of long-term eigenvalues; a second computing circuit, coupled to the first computing circuit, for computing a plurality of difference values for the plurality of long-term eigenvalues, and for determining an index corresponding to a difference value of the plurality of difference values; a spectrum generation circuit, coupled to the second computing circuit, for generating a pseudo spectrum according to the index, the plurality of eigenvectors and a steering vector; and a determining circuit, coupled to the spectrum generation circuit, for determining at least one peak of the pseudo spectrum and at least one parameter corresponding to the at least one peak.

A method for handling a wireless sensing comprises: generating a phase vector according to a phase signal; estimating the phase vector to generate an estimated phase matrix; decomposing the estimated phase matrix to generate an eigenvalue matrix and an eigenvector matrix, wherein the eigenvalue matrix comprises a plurality of eigenvalues and the eigenvector matrix comprises a plurality of eigenvectors; performing a long-term average for the plurality of eigenvalues to generate a plurality of long-term eigenvalues; computing a plurality of difference values for the plurality of long-term eigenvalues; determining an index corresponding to a difference value of the plurality of difference values; generating a pseudo spectrum according to the index, the plurality of eigenvectors and a steering vector; and determining at least one peak of the pseudo spectrum and at least one parameter corresponding to the at least one peak.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
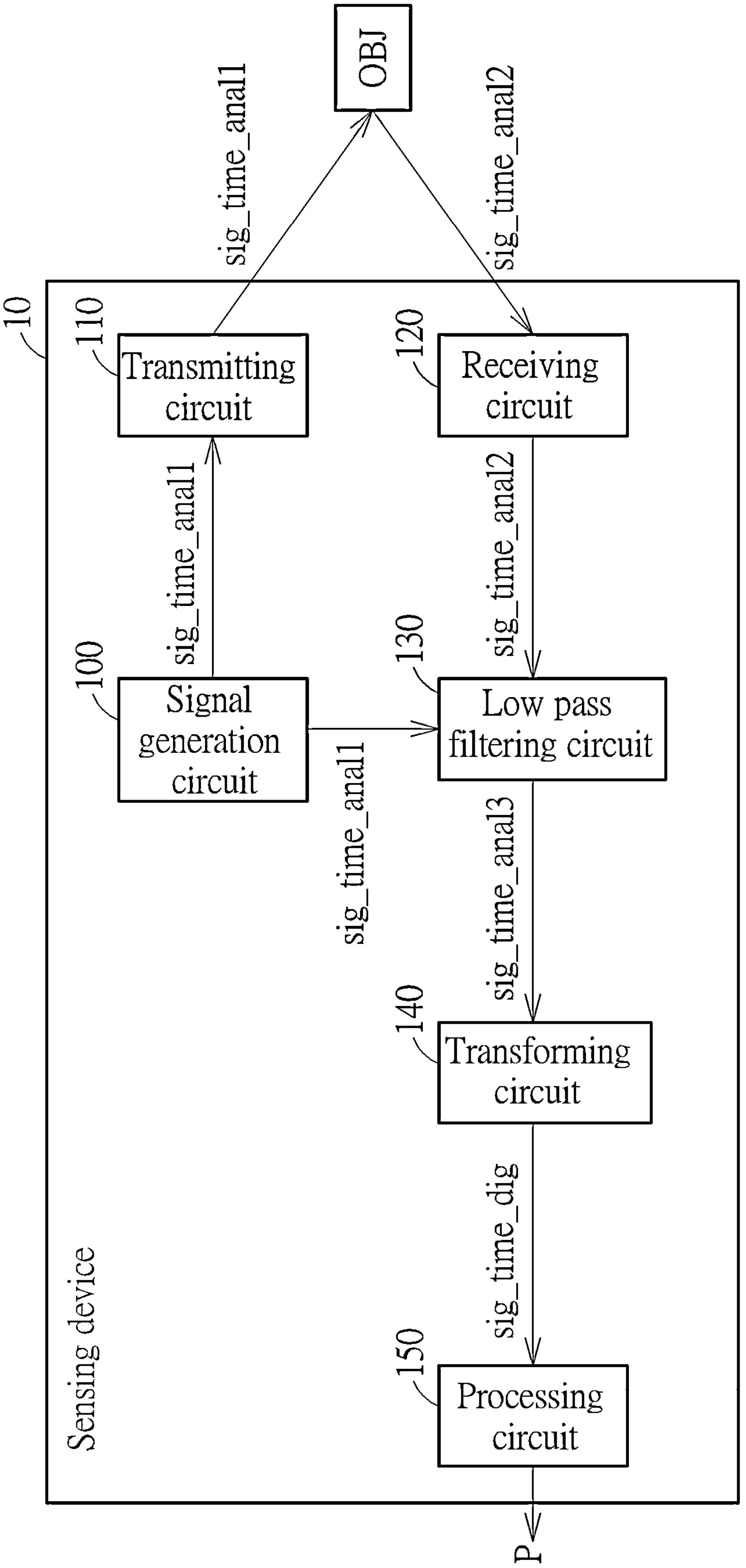
FIG. 1 is a schematic diagram of a sensing device according to an example of the present invention.

FIG. 1 is a schematic diagram of a sensing device 10 according to an example of the present invention. The sensing device 10 may comprise a signal generation circuit 100, a transmitting circuit 110, a receiving circuit 120, a low pass filtering circuit 130 (e.g., a low pass filter (LPF)), a transforming circuit 140 (e.g., an analog-to-digital converter (ADC)) and a processing circuit 150. The sensing device 10 may be applied in a wireless communication system such as a wireless local area network (WLAN), a Long Term Evolution (LTE) system, an LTE-advanced (LTE-A) system, a 5th generation (5G) system, etc. The sensing device 10 may support an Institute of Electrical and Electronics Engineers (IEEE) standard (e.g., 802.11AX, 802.11be or a subsequent version). The IEEE 802.11 standard may support an Orthogonal Frequency Division Multiple Access (OFDMA) and/or a Multi-User Multiple-Input Multiple-Output (MU-MIMO). In one example, the sensing device 10 may be a Frequency Modulated Continuous Wave (FMCW) device.

In FIG. 1, the signal generation circuit 100 is configured to generate a first time-domain analog signal sig_time_anal1. The first time-domain analog signal sig_time_anal1 is a chirp signal. The transmitting circuit 110 is coupled to the signal generation circuit 100, and is configured to transmit the first time-domain analog signal sig_time_anal1. The receiving circuit 120 is configured to receive a second time-domain analog signal sig_time_anal2. The second time-domain analog signal sig_time_anal2 is a reflected signal of the first time-domain analog signal sig_time_anal1 (e.g., reflected by a sensing object OBJ). The low pass filtering circuit 130 is coupled to the signal generation circuit 100 and the receiving circuit 120, and is configured to perform a mixing process and a low-pass filtering process according to the first time-domain analog signal sig_time_anal1 and the second time-domain analog signal sig_time_anal2 to generate a third time-domain analog signal sig_time_anal3. The transforming circuit 140 is coupled to the low pass filtering circuit 130, and is configured to transform the third time-domain analog signal sig_time_anal3 to generate a time-domain digital signal sig_time_dig. The processing circuit 150 is coupled to the transforming circuit 140, and is configured to sense (compute) at least one parameter P associated with the sensing object OBJ according to the time-domain digital signal sig_time_dig. In one example, the at least one parameter P may be a range between the sensing object OBJ and the sensing device 10, at least one vibration frequency of the sensing object OBJ and/or at least one incident angle associated with the sensing object OBJ and the sensing device 10.

Figure 2:
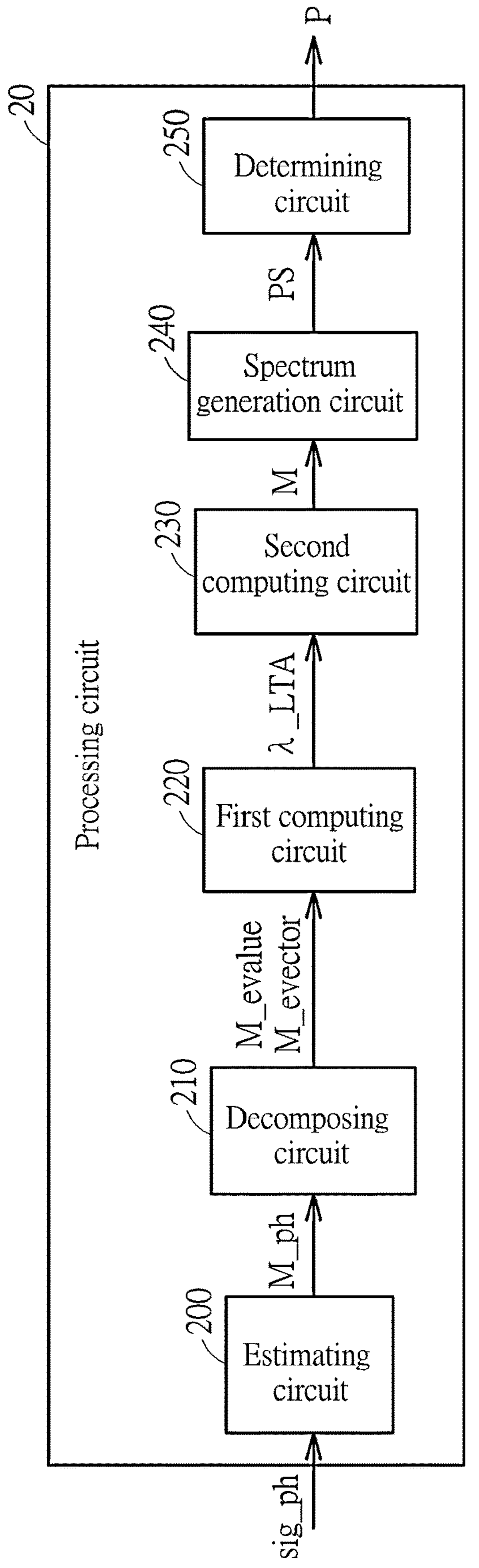
FIG. 2 is a schematic diagram of a processing circuit according to an example of the present invention.

FIG. 2 is a schematic diagram of a processing circuit 20 according to an example of the present invention. The processing circuit 20 may be the processing circuit 150 in FIG. 1. The processing circuit 20 comprises an estimating circuit 200, a decomposing circuit 210, a first computing circuit 220, a second computing circuit 230, a spectrum generation circuit 240 and a determining circuit 250. In detail, the estimating circuit 200 is configured to generate a phase vector according to a phase signal sig_ph and estimate the phase vector to generate an estimated phase matrix M_ph. The decomposing circuit 210 is coupled to the estimating circuit 200, and is configured to decompose the estimated phase matrix M_ph to generate an eigenvalue matrix M_evalue and an eigenvector matrix M_evector. The eigenvalue matrix M_evalue comprises a plurality of eigenvalues, and the eigenvector matrix M_evector comprises a plurality of eigenvectors. The first computing circuit 220 is coupled to the decomposing circuit 210, and is configured to perform a long-term average for the plurality of eigenvalues to generate a plurality of long-term eigenvalues λ_LTA. The second computing circuit 230 is coupled to the first computing circuit 220, and is configured to compute a plurality of difference values for the plurality of long-term eigenvalues λ_LTA and determine an index M corresponding to a difference value of the plurality of difference values. The spectrum generation circuit 240 is coupled to the second computing circuit 230, and is configured to generate a pseudo spectrum PS according to the index M, the plurality of eigenvectors and a steering vector. The determining circuit 250 is coupled to the spectrum generation circuit 240, and is configured to determine at least one peak of the pseudo spectrum PS and at least one parameter P corresponding to the at least one peak.

In one example, the phase signal sig_ph comprises at least one complex exponential. In one example, the at least one complex exponential is associated with the at least one parameter P. In one example, the plurality of eigenvalues correspond to the plurality of eigenvectors, respectively. In one example, one of the plurality of difference values is a difference value between two adjacent long-term eigenvalues among the plurality of long-term eigenvalues λ_LTA. In one example, the second computing circuit 230 selects at least one difference value from the plurality of difference values. The at least one difference value is greater than a threshold. Then, the second computing circuit 230 selects the index from at least one index corresponding to the at least one difference value. In one example, the threshold is a minimum of a signal-to-noise ratio (SNR) needed by the sensing device 10. In one example, the selected index is a maximum of the at least one index. In one example, the at least one parameter P is at least one vibration frequency or at least one incident angle.

In one example, the process circuit 20 further comprises a transforming circuit (e.g., Fast Fourier Transform (FFT) circuit), a detecting circuit and a third computing circuit. The transforming circuit is coupled to the transforming circuit 140 in FIG. 1, and is configured to transform a time-domain digital signal (e.g., the time-domain digital signal sig_time_dig) to generate a first frequency-domain signal. The detecting circuit is coupled to the transforming circuit, and is configured to detect a maximum of the first frequency-domain signal to generate a second frequency-domain signal. The third computing circuit is coupled to the detecting circuit and the estimating circuit 200 in FIG. 2, and is configured to compute the phase signal sig_ph of the second frequency-domain signal. In one example, the transforming circuit may be a Range-FFT circuit, a Doppler-FFT circuit and/or an Angle-FFT circuit.

The following example is used for illustrating how the sensing device 10 and the processing circuit 20 sense (or compute) the at least one parameter (the at least one vibration frequency or the at least one incident angle) associated with the sensing object. First, the signal generation circuit 100 generates a radio frequency (RF) transmitting signal $x_T(t)$ (i.e., the first time-domain analog signal sig_time_anal1), and the transmitting circuit 110 transmits the RF transmitting signal $x_T(t)$. The RF transmitting signal $x_T(t)$ can be expressed as an equation (Eq. 1):

$$x_T(t) = A_T\cos\left(2\pi f_c t + \pi\frac{B}{T_c}t^2 + \theta_0\right) = A_T\cos(2\pi f_T t + \theta_0) \tag{Eq. 1}$$

wherein $A_T$ is a transmitting amplitude, $f_c$ is a carrier frequency, $\theta_0$ is an initial phase, $f_T$ is a chirp frequency $$\left(f_T = \frac{1}{2\pi}\frac{d\theta(x_T(t))}{dt} = f_c + \frac{B}{T_c}t\right),$$

$T_c$ is a chirp time ($N_c$ chirp times $T_c$ may be seen as a frame time $T_f$, i.e., $T_f=N_cT_c$), and B is sweeping bandwidth. After the RF transmitting signal $x_T(t)$ is reflected by a sensing object (e.g., the sensing object OBJ), the receiving circuit 120 receives a RF receiving signal $x_R(t)$ (i.e., the second time-domain analog signal sig_time_anal2). The RF receiving signal $x_R(t)$ can be expressed as an equation (Eq. 2):

$$x_R(t) = x_T(t-\tau) = A_R\cos(2\pi f_T(t-\tau) + \theta_0 + \phi) \tag{Eq. 2}$$

wherein $A_R$ is a receiving amplitude, τ is a delay $$\left(\tau = \frac{2R}{c},\right.$$

wherein R is a range between the sensing object and the sensing device 10 and c is a velocity of light), $\theta_0$ is the initial phase, $f_T$ is the chirp frequency, $\phi$ is a receiving phase $$(\phi = 2\pi f_c\tau = 2\pi f_c\frac{2R}{c} = 4\pi R\left(\frac{f_c}{c}\right) = \frac{4\pi R}{\lambda},$$

wherein $f_c$ is the carrier frequency and λ is a signal wavelength). The low pass filtering circuit 130 performs a mixing process and a low-pass filtering process for the RF transmitting signal $x_T(t)$ and the RF receiving signal $x_R(t)$ to generate an intermediate frequency (IF) signal $x_{IF}(t)$ (i.e., the third time-domain analog signal sig_time_anal3). The IF signal $x_{IF}(t)$ can be expressed as an equation (Eq. 3):

$$x_{IF}(t) = A\cos(2\pi f_{IF}t + \phi) \quad \text{(Eq. 3)}$$

wherein A is an amplitude, $f_{IF}$ is an IF frequency and ϕ is the receiving phase. The transforming circuit 140 transforms the IF signal $x_{IF}(t)$ to a digital signal x(n) (i.e., the time-domain digital signal sig_time_dig). The digital signal x(n) can be expressed as an equation (Eq. 4):

$$x(n) = x_{IF}(nT_s) \quad \text{(Eq. 4)}$$

wherein $T_s$ is a sampling time $$(T_s = \frac{1}{f_s},$$

wherein $f_s$ is a sampling frequency). The processing circuit 150 (or the processing circuit 20) selects a digital signal sequence for a single chirp time [x(n) x(n+1) . . . x(n+N'−1)] (wherein $$N' = \left\lfloor\frac{T_c}{T_s}\right\rfloor),$$

and estimates an estimated frequency $\hat{f}_{IF}$ according to the digital signal sequence [x(n) x(n+1) . . . x(n+N'−1)] via the Range-FFT. Then, the processing circuit 150 (or the processing circuit 20) computes an estimated range $\hat{R}$ via the following equation (Eq. 5):

$$\hat{R} = \frac{c\cdot T_c}{2B}\cdot\hat{f}_{IF} \quad \text{(Eq. 5)}$$

Figure 3:
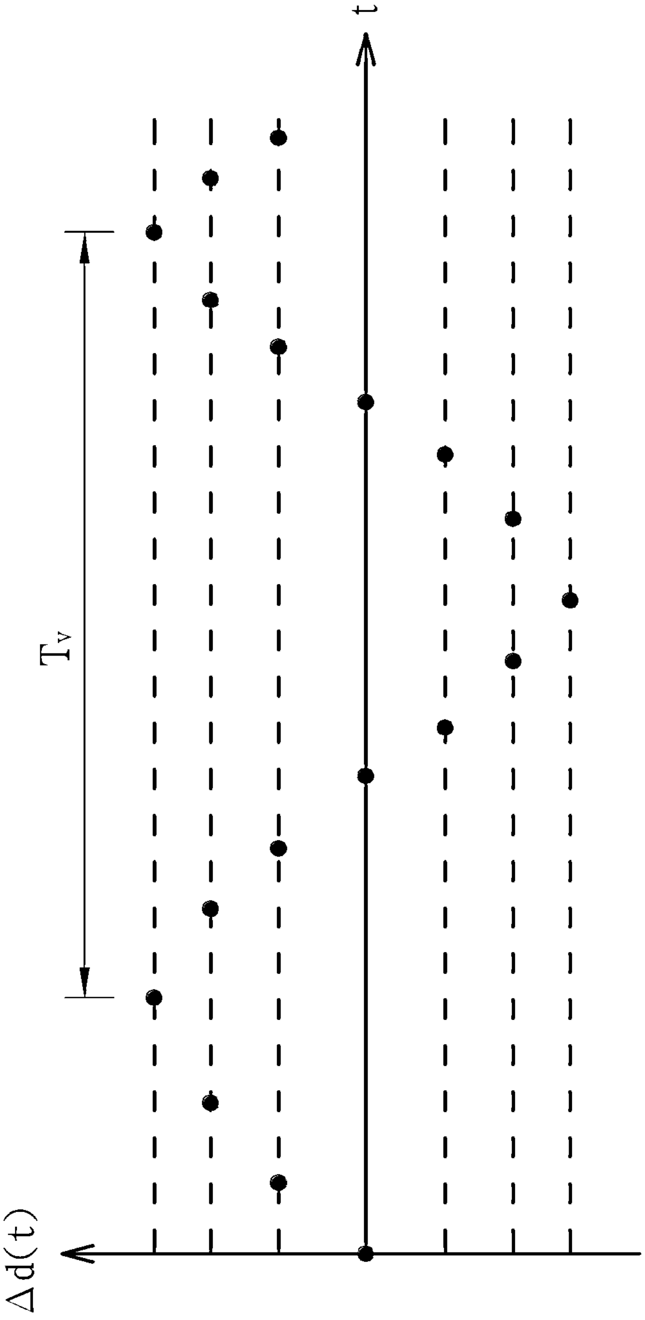
FIG. 3 is a schematic diagram of a sensing object vibration according to an example of the present invention.

It is assumed that the sensing object has a periodic vibration as shown in FIG. 3. In FIG. 3, Δd(t) is an offset caused by the periodic vibration and $T_v$ is a vibration period. Thus, a range between the sensing object and the sensing device 10 is R'(t)=R+Δd(t), and the receiving phase ϕ can be replaced by an equation (Eq. 6):

$$\phi'(t) = \frac{4\pi R'(t)}{\lambda} = \frac{4\pi(R+\Delta d(t))}{\lambda} = \frac{4\pi R}{\lambda} + \frac{4\pi\Delta d(t)}{\lambda} = \phi + \Delta\phi(t) \quad \text{(Eq. 6)}$$

wherein Δϕ(t) is a phase offset caused by the periodic vibration $$\left(\Delta\phi(t) = \frac{4\pi\Delta d(t)}{\lambda}\right).$$

Figure 4:
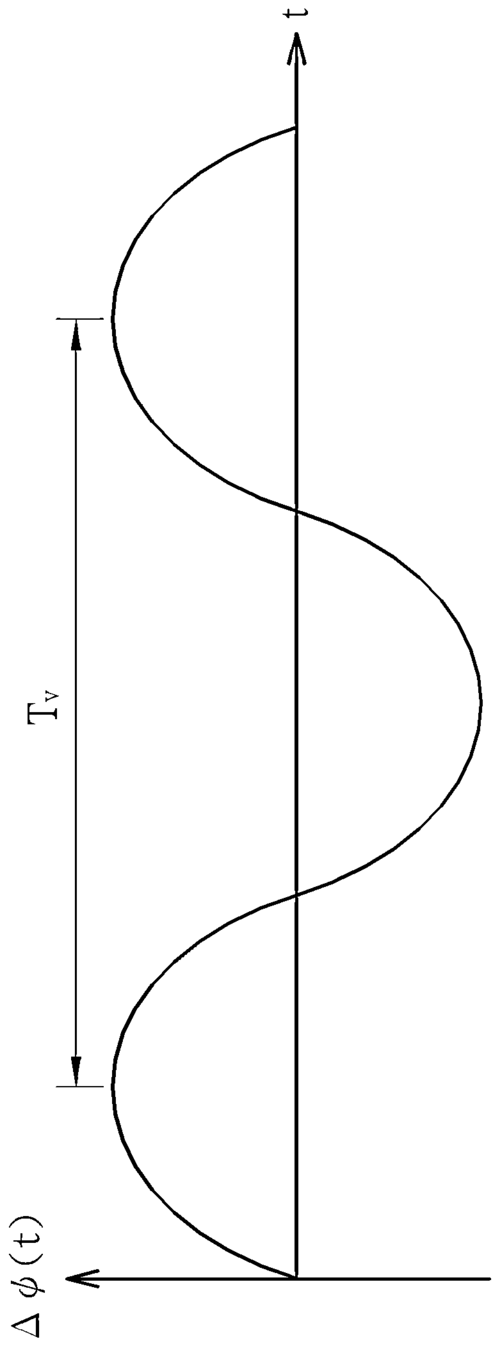
FIG. 4 is a schematic diagram of a phase offset according to an example of the present invention.

A change of the phase offset Δϕ(t) with a time t can be known by referring to FIG. 4. In FIG. 4, a horizontal axis is the time t and a vertical axis is the phase offset Δϕ(t). The processing circuit 150 (or the processing circuit 20) estimates a frequency of changes in the phase offset Δϕ(t) by observing the RF transmitting signal $x_T(t)$ and the RF receiving signal $x_R(t)$ in continuous $N_c$ chirp times $T_c$ (i.e., one frame time $T_f$).

Figure 5:
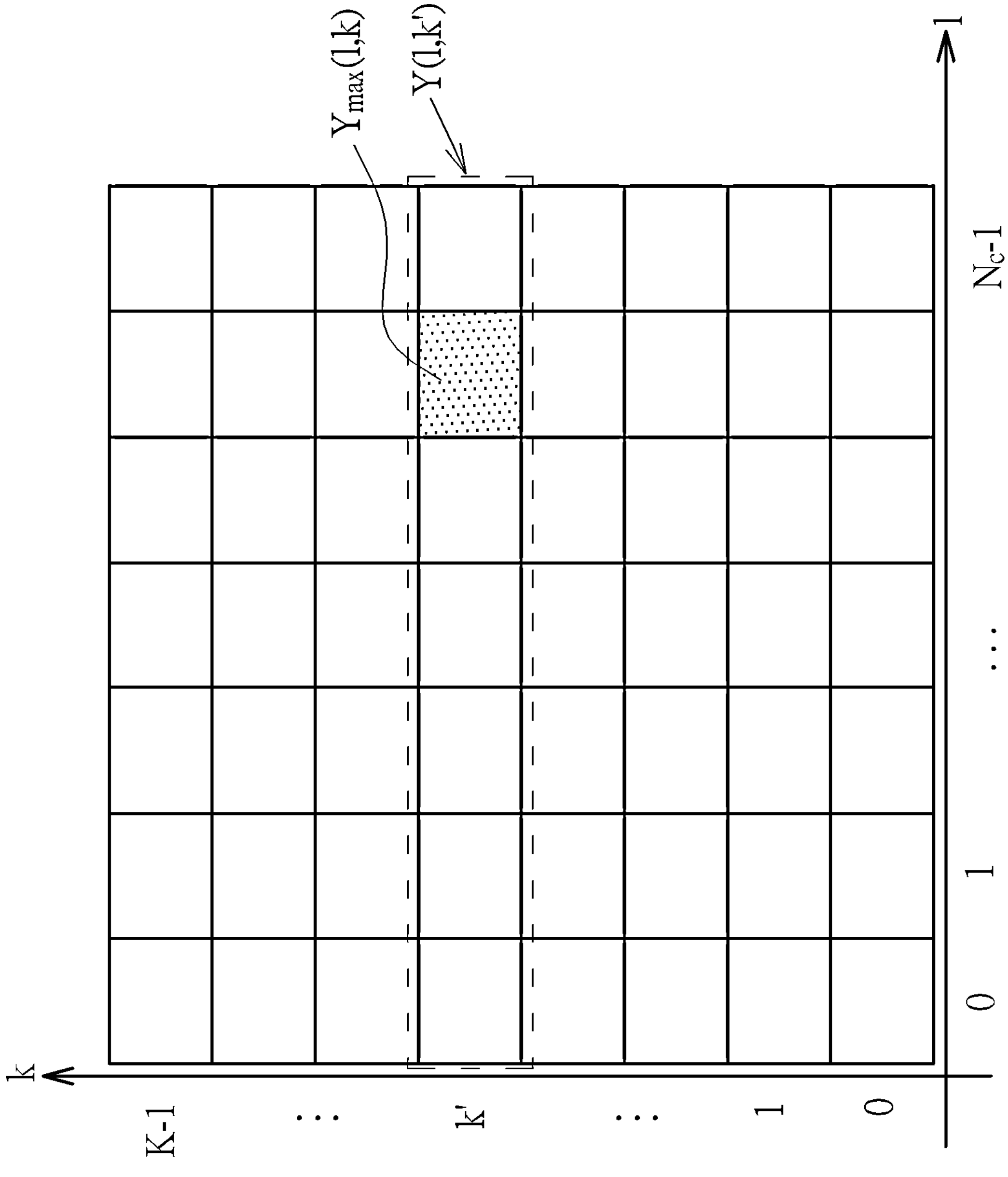
FIG. 5 is a schematic diagram of a complex signal according to an example of the present invention.

The transforming circuit in the processing circuit 150 (or the processing circuit 20) transforms continuous $N_c$ digital signals x(l,n) to complex signals Y(l,k) (i.e., the first frequency-domain signal) via the Range-FFT. l is an index of the digital signal x(l,n), where l=0, 1, . . . , $N_c$−1. k is an index of the Range-FFT, where k=0, 1, . . . , K−1. FIG. 5 is a schematic diagram of a complex signal Y(l,k) according to an example of the present invention. In FIG. 5, a horizontal axis is the index l of the digital signal x(l,n) and a vertical axis is the index k of the Range-FFT. The detecting circuit in the processing circuit 150 (or the processing circuit 20) detects a maximum $Y_{max}(l,k)$ of the complex signals Y(l,k) (i.e., the maximum of the first frequency-domain signal) shown as a dotted area in FIG. 5, and determines a complex signal Y(l,k') (i.e., the second frequency-domain signal) corresponding to the maximum $Y_{max}(l,k)$ shown as a dashed box in FIG. 5. The third computing circuit in the processing circuit 150 (or the processing circuit 20) computes a phase signal ϕ(l,k') of the complex signal Y(l,k') (i.e., the phase signal sig_ph) as follows:

$$\phi(l, k') = \tan^{-1}(Y(l, k')) \quad \text{(Eq. 7)}$$

Figure 6:
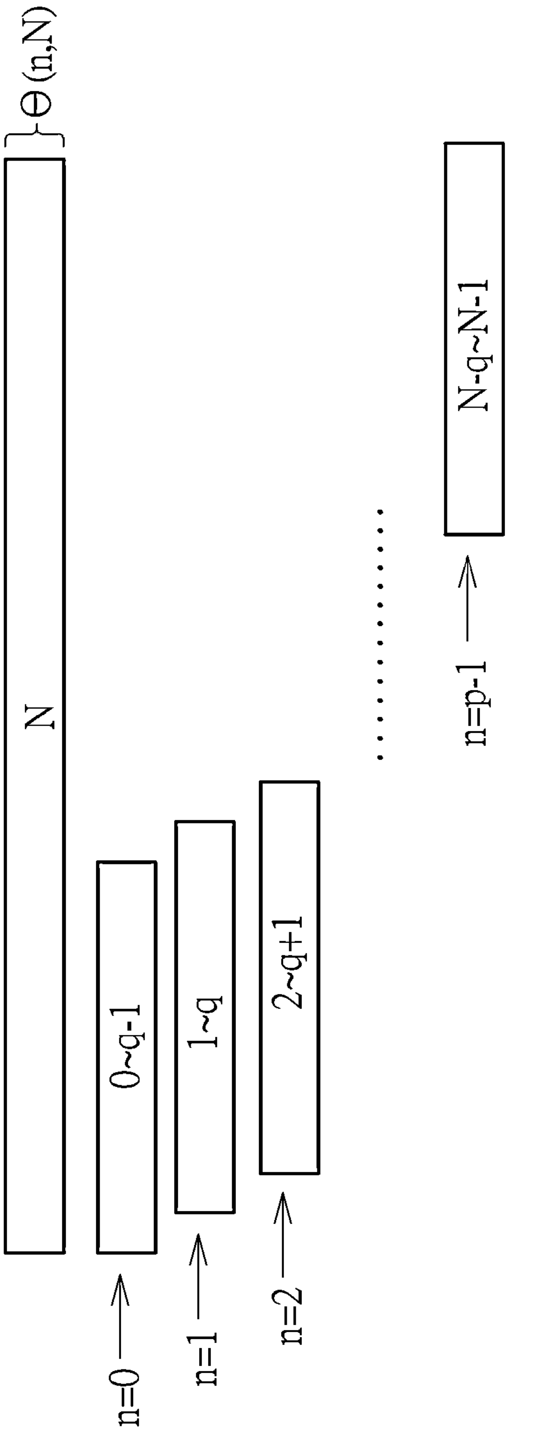
FIG. 6 is a schematic diagram of a plurality of segments divided from a phase vector according to an example of the present invention.

The equation (Eq. 7) can derive a vibration frequency via an FFT operation (e.g., the Doppler-FFT). A resolution of the FFT operation is limited by an observation time, wherein increasing the observation time makes it impossible to detect instantaneous changes in the vibration frequency of the sensing object. In order to avoid increasing the observation time, the phase signal ϕ(l,k') can be expressed as a sequence with multiple complex exponentials as follows:

$$[\phi(0, k')\phi(1, k') \ldots \phi(N_c-1, k')] = \left[1\left(a_0e^{jw_0} + \ldots + a_{M-1}e^{jw_{M-1}}\right)\right. \ldots \left.\left(a_0e^{j(N_c-1)w_0} + \ldots + a_{M-1}e^{j(N_c-1)w_{M-1}}\right)\right] \quad \text{(Eq. 8)}$$

wherein $\{w_0\ w_1 \ldots w_{M-1}\}$ is M vibration frequencies of the sensing object, $\{a_0\ a_1 \ldots a_{M-1}\}$ is M amplitudes of the sensing object, and M is an unknown positive integer. M can be derived via a super-resolution method (e.g., a Multiple Signal Classification (MUSIC) algorithm) to obtain the vibration frequencies $\{w_0\ w_1 \ldots w_{M-1}\}$. The estimating circuit 200 generates a phase vector Θ(n,N) according to the phase signal ϕ(l,k'). The phase vector Θ(n,N) can be expressed as an equation (Eq. 9):

$$\Theta(n, N) = [\phi(n, k')\phi(n+1, k') \ldots \phi(n+N-1, k')]^T \quad \text{(Eq. 9)}$$

wherein N is a length of the phase vector $\Theta(n,N)$, and $N \neq N_c$. The estimating circuit 200 divides the phase vector $\Theta(n,N)$ with the length N into p segments shown in FIG. 6, and a length of each segment is q. Thus, the estimating circuit 200 generates an estimated phase matrix $\hat{R}_x$ (i.e., the estimated phase matrix M_ph) shown in an equation (Eq. 10)

$$\hat{R}_x = \frac{1}{p}\sum_{n=0}^{p-1}\Theta(n, q)\Theta^H(n, q) \quad \text{(Eq. 10)}$$

wherein H is a conjugate transpose. The decomposing circuit 210 decomposes the estimated phase matrix $\hat{R}_x$ shown in an equation (Eq. 11):

$$\hat{R}_x[u_1 \ u_2 \ \dots \ u_q]\begin{bmatrix}\lambda_1 & 0 & 0\\ 0 & \ddots & 0\\ 0 & 0 & \lambda_q\end{bmatrix}[v_1^T \ v_2^T \ \dots \ v_q^T] \quad \text{(Eq. 11)}$$

wherein $\lambda_i$ are eigenvalues of the estimated phase matrix $\hat{R}_x$ ($i=1, 2, \ldots, q$, and $\lambda_1>\lambda_2> \ldots >\lambda_q$) (i.e., the plurality of eigenvalues) and $v_i$ are eigenvectors corresponding to the eigenvalues $\lambda_i$ ($i=1, 2, \ldots, q$) (i.e., the plurality of eigenvectors). $\{\lambda_1, \lambda_2, \ldots, \lambda_M\}$ may be seen as signal powers, $\{\lambda_{M+1}, \lambda_{M+2}, \ldots, \lambda_q\}$ may be seen as noise powers, and $\{v_1, v_2, \ldots, v_M\}$ may be seen as signal subspaces, and $\{v_{M+1}, v_{M+2}, \ldots, v_q\}$ may be seen as noise subspaces. In order to reduce computation errors, the first computing circuit 220 performs a long-term average for the eigenvalues $\lambda_i$ to generate long-term eigenvalues $$\lambda_i'$$

(i.e., the plurality of long-term eigenvalues λ_LTA). The long-term eigenvalues $$\lambda_i'$$

can be expressed as an equation (Eq. 12):

$$\lambda_i'(n+1) = \alpha\lambda_i'(n) + (1-\alpha)\lambda_i(n+1) \quad \text{(Eq. 12)}$$

wherein $i=1, 2, \ldots, q$, and $\alpha$ is a forgetting factor ($\alpha<1.0$). The second computing circuit 230 computes a difference value for two adjacent long-term eigenvalues $$\lambda_i', \ 10\cdot\log_{10}(\lambda_i') - 10\cdot\log_{10}(\lambda_{i+1}')$$

(in units of dB). The second computing circuit 230 selects a maximum index $\hat{M}$ (i.e., the index M) from index(es) i whose corresponding difference value (s) is greater than a minimum SNR requirement $\delta$ (in units of dB) for the sensing device 10, as shown in an equation (Eq. 13):

$$\hat{M} = \max\left\{\text{find } i = 1, 2, \ldots, q-1 \text{ s.t} \left(10\cdot\log_{10}\left(\frac{\lambda_i'}{\lambda_{i+1}'}\right) > \delta\right)\right\} \quad \text{(Eq. 13)}$$

Figure 7:
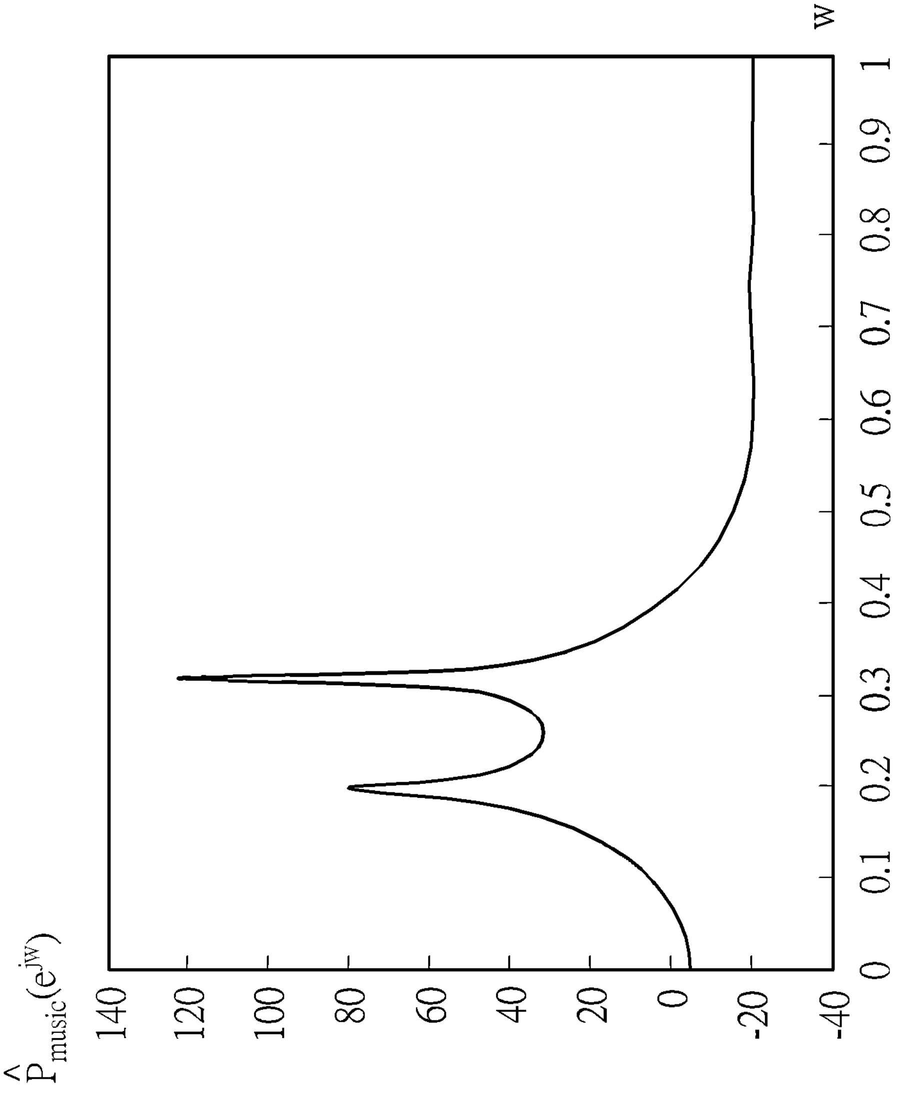
FIG. 7 is a schematic diagram of a pseudo spectrum according to an example of the present invention.

Then, the spectrum generation circuit 240 generates a pseudo spectrum $\hat{P}_{music}(e^{jw})$ (i.e., the pseudo spectrum PS) according to the maximum index $\hat{M}$, the eigenvectors $v_i$ and a steering vector $s_w$. The pseudo spectrum $\hat{P}_{music}(e^{jw})$ can be expressed as an equation (Eq. 14):

$$\hat{P}_{music}(e^{jw}) = \frac{1}{\sum_{i=M+1}^{q}|s_w^H v_i|^2} \quad \text{(Eq. 14)}$$

wherein $s_w=[1, e^{jw}, e^{j2w}, \ldots, e^{j(q-1)w}]^T$, and w is a guessed vibration frequency. If the steering vector $s_w$ belongs to the signal subspace, the steering vector $s_w$ and the noise subspace are orthogonal (i.e., $$|s_w^H v_i| \approx 0,$$

wherein $i\in\{M+1,q\}$). In this case, the pseudo spectrum $\hat{P}_{music}(e^{jw})$ is an extreme maximum. The determining circuit 250 determines vibration frequencies $w_m$ corresponding to the first $\hat{M}$ extreme maximums of the pseudo spectrum $\hat{P}_{music}(e^{jw})$, i.e., the vibration frequencies of the sensing object. $m=1, 2, \ldots, \hat{M}$. FIG. 7 is a schematic diagram of the pseudo spectrum $\hat{P}_{music}(e^{jw})$ according to an example of the present invention. In FIG. 7, a horizontal axis is the vibration frequency w and a vertical axis is the pseudo spectrum $\hat{P}_{music}(e^{jw})$. There are two extreme maximums in FIG. 7. The vibration frequencies corresponding to the two extreme maximums are 0.2 and 0.32 which are the vibration frequencies of the sensing object.

Assuming that a vibration frequency scope of the sensing object is known, the determining circuit 250 determines the extreme maximum of the pseudo spectrum $\hat{P}_{music}(e^{jw})$ and the vibration frequency $\hat{w}_n$ corresponding to the extreme maximum within the vibration frequency scope to reduce a computational complexity. The vibration frequency $\hat{w}_n$ can be expressed as an equation (Eq. 15):

$$\hat{w}_n = \underset{w_{n,L}\le w_n(\Delta w_n)\le w_{n,H}}{\operatorname{argmax}} \hat{P}_{music}(e^{jw}) \quad \text{(Eq. 15)}$$

wherein $\{w_{n,L}, w_{n,H}\}$ is the vibration frequency scope of the sensing object, $\Delta w_n$ is a sweeping resolution and $w_n$ is a sweeping frequency $$\left(w_n = w_{n,L} + k\cdot\Delta w_n, \text{ wherein } k = 0, 1, \ldots, K \text{ and } K = \left\lfloor\frac{w_{n,H} - w_{n,L}}{\Delta w_n}\right\rfloor\right).$$

Figure 8:
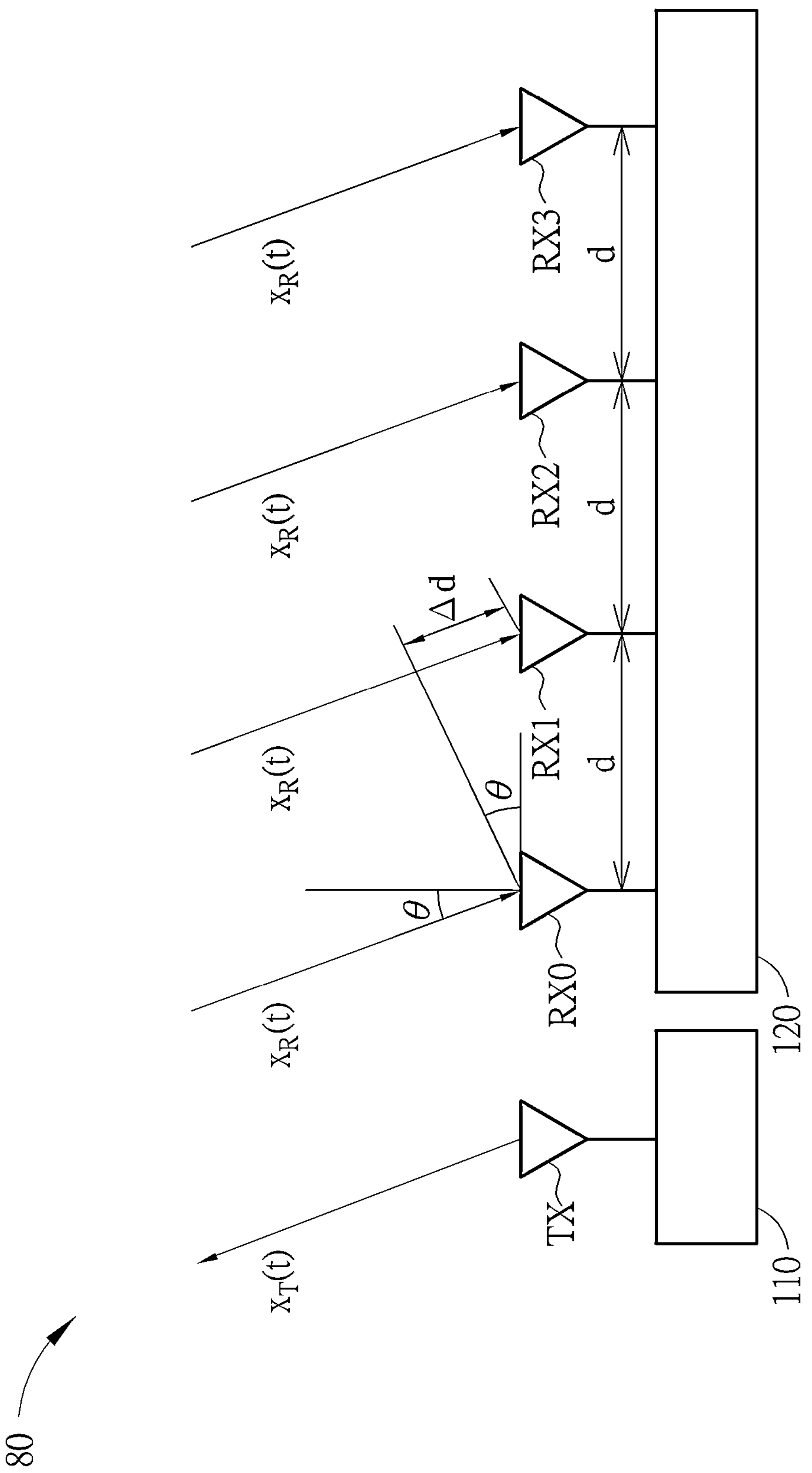
FIG. 8 is a schematic diagram of a multi-antennas sensing device according to an example of the present invention.

In addition, an incident angle can be derived according to distances between multiple antennas. FIG. 8 is a schematic diagram of a multi-antennas sensing device 80 according to an example of the present invention. The multi-antennas sensing device 80 comprises the transmitting circuit 110 and the receiving circuit 120. The transmitting circuit 110 is configured with a transmitting antenna TX for transmitting the RF transmitting signal $x_T(t)$. The receiving circuit 120 is configured with receiving antennas RX0-RX3 for receiving the RF receiving signal $x_R(t)$. A distance of two adjacent receiving antennas of the receiving antennas RX0-RX3 is d. An incident angle of the RF receiving signal $x_R(t)$ to the receiving antennas RX0-RX3 is θ. A distance difference Δd(r) of distances between a sensing object (not shown in FIG. 8) and two adjacent receiving antennas of the receiving antennas RX0-RX3 can be expressed as an equation (Eq. 16)

$$\Delta d(r) = r \cdot d \cdot \sin\theta \quad \text{(Eq. 16)}$$

wherein r is an index of the receiving antennas RX0-RX3 (r=0, 1, 2, . . . , $N_R-1$, wherein $N_R$ is a number of the receiving antennas). In FIG. 8, $N_R=4$. The phase offset Δϕ(r) of the receiving antennas RX0-RX3 can be expressed as an equation (Eq. 17):

$$\Delta\phi(r) = \frac{2\pi\Delta d(r)}{\lambda} = \frac{2\pi r \cdot d \cdot \sin\theta}{\lambda} \quad \text{(Eq. 17)}$$

The equation (Eq. 17) can derive the incident angle θ via an FFT operation (e.g., the Angle-FFT). The resolution of the FFT operation is limited by the number of the receiving antennas. In order to reduce the number of the receiving antennas (i.e., reduce a hardware cost), the phase offset Δϕ(r) can be expressed as a sequence with multiple complex exponentials as follows:

$$\left[1 \; \frac{2\pi d \cdot \sin\theta}{\lambda} \; \frac{2 \cdot 2\pi d \cdot \sin\theta}{\lambda} \; \cdots \; \frac{(N_R-1)\cdot 2\pi d \cdot \sin\theta}{\lambda}\right] = \left[1 \;\; e^{jw_\theta} \;\; e^{j2w_\theta} \;\; \cdots \;\; e^{j(N_R-1)w_\theta}\right] \quad \text{(Eq. 18)}$$

Figure 9:
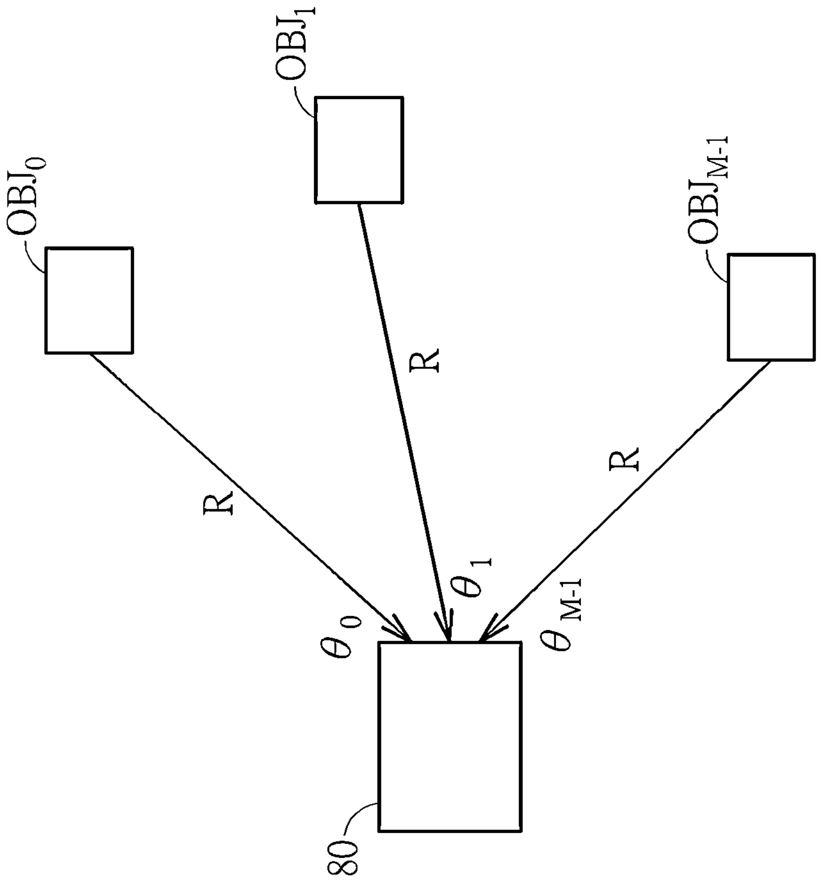
FIG. 9 is a schematic diagram of a multi-antennas sensing device sensing a plurality of sensing objects according to an example of the present invention.

It is assumed that a receiving signal is a combination of signals reflected by sensing objects shown in FIG. 9. In FIG. 9, a range between the multi-antennas sensing device 80 and each of the sensing objects $OBJ_0$-$OBJ_{M-1}$ is R and incident angles for the sensing objects $OBJ_0$-$OBJ_{M-1}$ are $\theta_0$-$\theta_{M-1}$. The phase offset Δϕ(r) can be expressed as a sequence with multiple complex exponentials as follows:

$$\left[1\left(e^{jw\theta_0} + \ldots + e^{jw\theta_{M-1}}\right) \ldots \left(e^{j(N_R-1)w\theta_0} + \ldots + e^{j(N_R-1)w\theta_{M-1}}\right)\right] \quad \text{(Eq. 19)}$$

The pseudo spectrum $\hat{P}_{music}(e^{jw})$ is obtained according to the abovementioned operations of the estimating circuit 200, the decomposing circuit 210, the first computing circuit 220, the second computing circuit 230, the spectrum generation circuit 240 and the determining circuit 250. Incident angles $w_m$ (m=1, 2, . . . , $\hat{M}$) corresponding to first $\hat{M}$ extreme maximums of the pseudo spectrum $\hat{P}_{music}(e^{jw})$ are the incident angles of the sensing objects $OBJ_0$-$OBJ_{M-1}$.

Figure 10:
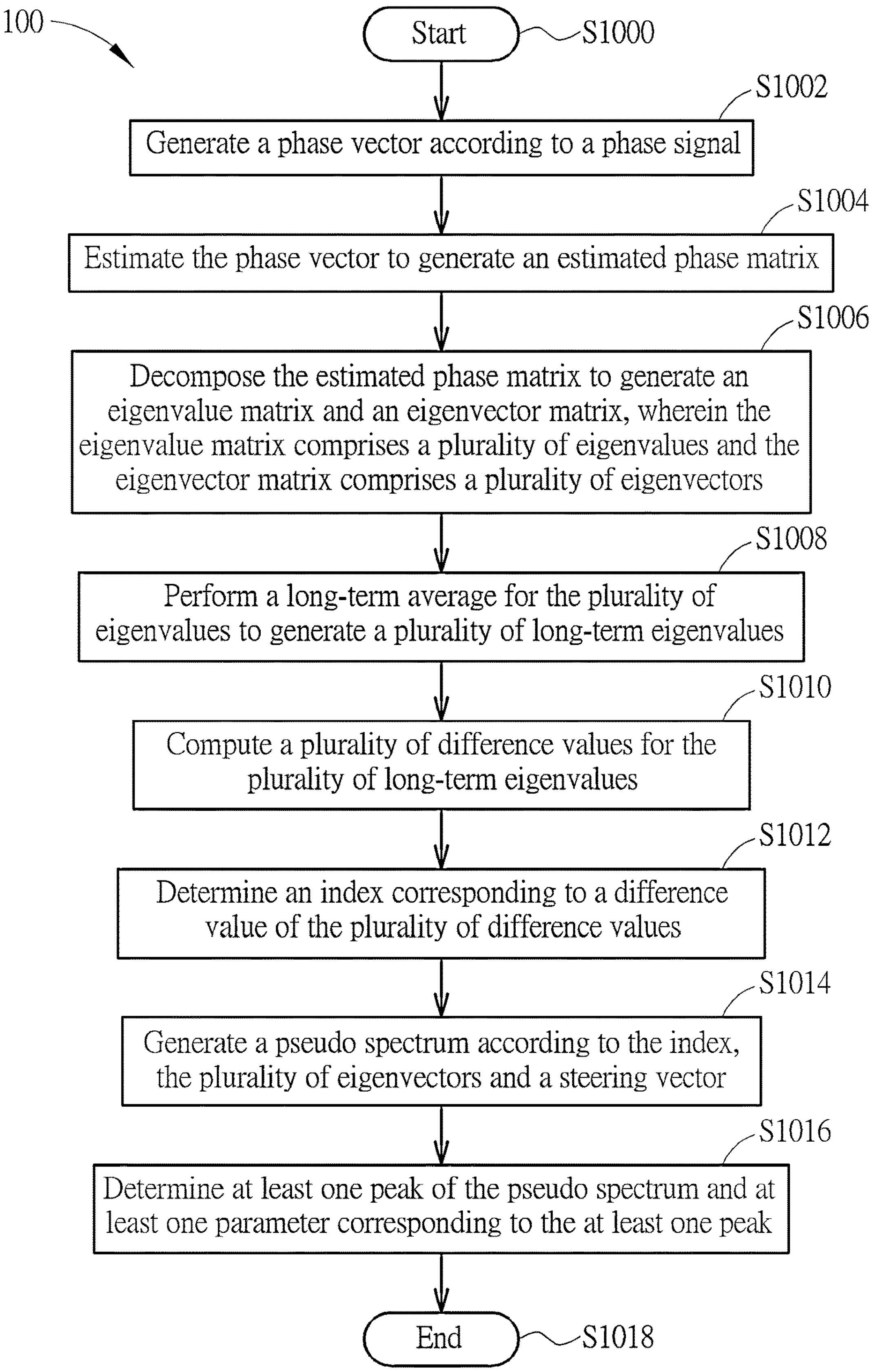
FIG. 10 is a flowchart of a process according to an example of the present invention.

Operations of the processing circuit 20 in the above examples can be summarized into a process 100 shown in FIG. 10, which may be performed by the processing circuit 150 in FIG. 1. The process 100 includes the following steps:

Step S1000: Start.

Step S1002: Generate a phase vector according to a phase signal.

Step S1004: Estimate the phase vector to generate an estimated phase matrix.

Step S1006: Decompose the estimated phase matrix to generate an eigenvalue matrix and an eigenvector matrix, wherein the eigenvalue matrix comprises a plurality of eigenvalues and the eigenvector matrix comprises a plurality of eigenvectors.

Step S1008: Perform a long-term average for the plurality of eigenvalues to generate a plurality of long-term eigenvalues.

Step S1010: Compute a plurality of difference values for the plurality of long-term eigenvalues.

Step S1012: Determine an index corresponding to a difference value of the plurality of difference values.

Step S1014: Generate a pseudo spectrum according to the index, the plurality of eigenvectors and a steering vector.

Step S1016: Determine at least one peak of the pseudo spectrum and at least one parameter corresponding to the at least one peak.

Step S1018: End.

Detailed descriptions and variations of the process 100 can be known by referring to the previous description, and are not narrated herein.

It should be noted that there are various possible realizations of the sensing device 10 (including the signal generation circuit 100, the transmitting circuit 110, the receiving circuit 120, the low pass filtering circuit 130, the transforming circuit 140 and the processing circuit 150) and the processing circuit 20 (including the estimating circuit 200, the decomposing circuit 210, the first computing circuit 220, the second computing circuit 230, the spectrum generation circuit 240 and the determining circuit 250). For example, the circuits mentioned above may be integrated into one or more circuits. In addition, the sensing device 10 and the processing circuit 20 may be realized by hardware (e.g., circuits), software, firmware (known as a combination of a hardware device, computer instructions and data that reside as read-only software on the hardware device), an electronic system or a combination of the devices mentioned above, but are not limited herein.

To sum up, the present invention provides a circuit and a method for handling wireless sensing. The vibration frequency and the incident angle of a sensing object are obtained via a super-resolution method (e.g., the MUSIC algorithm). Thus, the wireless sensing does not depend on the sampling frequency, the observation time and the number of receiving antennas.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A processing circuit, comprising:

an estimating circuit, for generating a phase vector according to a phase signal, and for estimating the phase vector to generate an estimated phase matrix;

a decomposing circuit, coupled to the estimating circuit, for decomposing the estimated phase matrix to generate an eigenvalue matrix and an eigenvector matrix, wherein the eigenvalue matrix comprises a plurality of eigenvalues and the eigenvector matrix comprises a plurality of eigenvectors;

a first computing circuit, coupled to the decomposing circuit, for performing a long-term average for the plurality of eigenvalues to generate a plurality of long-term eigenvalues;

a second computing circuit, coupled to the first computing circuit, for computing a plurality of difference values for the plurality of long-term eigenvalues, and for determining an index corresponding to a difference value of the plurality of difference values;

a spectrum generation circuit, coupled to the second computing circuit, for generating a pseudo spectrum according to the index, the plurality of eigenvectors and a steering vector; and a determining circuit, coupled to the spectrum generation circuit, for determining at least one peak of the pseudo spectrum and at least one parameter corresponding to the at least one peak.

2. The processing circuit of claim 1, wherein the phase signal comprises at least one complex exponential.

3. The processing circuit of claim 2, wherein the at least one complex exponential is associated with the at least one parameter.

4. The processing circuit of claim 1, wherein the plurality of eigenvalues correspond to the plurality of eigenvectors, respectively.

5. The processing circuit of claim 1, wherein one of the plurality of difference values is a difference value between two adjacent long-term eigenvalues among the plurality of long-term eigenvalues.

6. The processing circuit of claim 1, wherein the step of the second computing circuit determining the index corresponding to the difference value of the plurality of difference values comprises:

selecting at least one difference value from the plurality of difference values, wherein the at least one difference value is greater than a threshold; and selecting the index from at least one index corresponding to the at least one difference value.

7. The processing circuit of claim 6, wherein the index is a maximum of the at least one index.

8. The processing circuit of claim 1, wherein the at least one parameter is at least one vibration frequency or at least one incident angle.

9. The processing circuit of claim 1, further comprising:

a transforming circuit, for transforming a time-domain digital signal to generate a first frequency-domain signal;

a detecting circuit, coupled to the transforming circuit, for detecting a maximum of the first frequency-domain signal to generate a second frequency-domain signal; and a third computing circuit, coupled to the detecting circuit and the estimating circuit, for computing the phase signal of the second frequency-domain signal.

10. A method for handling wireless sensing, comprising:

generating a phase vector according to a phase signal;

estimating the phase vector to generate an estimated phase matrix;

decomposing the estimated phase matrix to generate an eigenvalue matrix and an eigenvector matrix, wherein the eigenvalue matrix comprises a plurality of eigenvalues and the eigenvector matrix comprises a plurality of eigenvectors;

performing a long-term average for the plurality of eigenvalues to generate a plurality of long-term eigenvalues;

computing a plurality of difference values for the plurality of long-term eigenvalues;

determining an index corresponding to a difference value of the plurality of difference values;

generating a pseudo spectrum according to the index, the plurality of eigenvectors and a steering vector; and determining at least one peak of the pseudo spectrum and at least one parameter corresponding to the at least one peak.

11. The method of claim 10, wherein the phase signal comprises at least one complex exponential.

12. The method of claim 11, wherein the at least one complex exponential is associated with the at least one parameter.

13. The method of claim 10, wherein the plurality of eigenvalues correspond to the plurality of eigenvectors, respectively.

14. The method of claim 10, wherein one of the plurality of difference values is a difference value between two adjacent long-term eigenvalues among the plurality of long-term eigenvalues.

15. The method of claim 10, wherein the step of determining the index corresponding to the difference value of the plurality of difference values comprises:

selecting at least one difference value from the plurality of difference values, wherein the at least one difference value is greater than a threshold; and selecting the index from at least one index corresponding to the at least one difference value.

16. The method of claim 15, wherein the index is a maximum of the at least one index.

17. The method of claim 10, wherein the at least one parameter is at least one vibration frequency or at least one incident angle.

18. The method of claim 10, further comprising:

transforming a time-domain digital signal to generate a first frequency-domain signal;

detecting a maximum of the first frequency-domain signal to generate a second frequency-domain signal; and computing the phase signal of the second frequency-domain signal.

* * * * *